United States Patent [19]

McGhee

[11] Patent Number: 4,549,160
[45] Date of Patent: Oct. 22, 1985

[54] THERMOSTAT CONTROL APPARATUS

[75] Inventor: James B. McGhee, El Cajon, Calif.

[73] Assignee: Leslie C. Hill, San Diego, Calif.

[21] Appl. No.: 517,725

[22] Filed: Jul. 27, 1983

[51] Int. Cl.⁴ ............................................ H01H 37/62
[52] U.S. Cl. ................................... 337/301; 337/305; 236/46 R
[58] Field of Search ............... 337/301, 302, 303, 380, 337/305, 381; 236/46 R

[56] References Cited

U.S. PATENT DOCUMENTS 4,016,402 4/1977 Scott .................................... 219/334
4,166,944 9/1979 Scott .................................... 219/330

OTHER PUBLICATIONS

Trade Literature of Aidan Industries Inc., Chatsworth, CA., A Product Referred to by the Trademark-Q-waterback-1981.

Primary Examiner—Harold Broome
Attorney, Agent, or Firm—Brown, Martin & Haller

[57] ABSTRACT

Apparatus for controlling a water heater thermostat for increased efficiency in fuel usage. A mounting bracket is adapted to fit on several different common types of thermostat control boxes and to removably receive a controller housing. A motor in the housing is coupled to a slip ring engaging the thermostat knob to raise and lower the thermostat temperature setting in accordance with sensor actuated circuitry responsive to incoming and outgoing water temperature. The coupling enables the apparatus to accommodate thermostats with different size knobs and rotatable in opposite directions.

53 Claims, 9 Drawing Figures

THERMOSTAT CONTROL APPARATUS

FIELD OF THE INVENTION

This invention relates generally to hot water heater controls and more particularly to apparatus for controlling the thermostat setting of a hot water heater for fuel economy.

DISCUSSION OF THE PRIOR ART

Typical water heater controls comprise a thermostat which is set at a desired high temperature and the temperature is maintained within a reasonable range of that temperature. Even when there is no use of hot water, such as overnight or on weekends or during vacations when there is no hot water use at all, the burner ignites periodically to maintain the high temperature of the water in the tank.

Timer controls have been devised to adjust the water heater thermostat between low and high settings, based on predicted uses of hot water with respect to the time of day. These are helpful in reducing fuel costs but they are not based on actual usage so the adjustments are somewhat arbitrary.

Systems have been devised which are responsive to the temperature in a water heater outflow line to control the setting of the heater thermostat dependent upon water usage. During periods of heavy demand, the thermostat is set at a high level in order to reheat the water as quickly as possible. When the water temperature reaches a predetermined high level, a thermoswitch opens to cause the apparatus to reduce the thermostat setting to a relative low level. Short duration or momentary usages of hot water do not affect the apparatus so that there is an efficiency in not starting the heating burner until significant demand for hot water occurs.

Alternatively, thermoswitches may be mounted to both the outflow and supply lines to provide improved control based upon hot water demand.

Examples of the control systems mentioned above are shown in U.S. Pat. Nos. 4,016,402 and 4,166,944. The systems are fully described in these patents, but practical apparatus for converting a common water heater and thermostat to be controlled by these fuel efficient systems were not shown in detail.

SUMMARY OF THE INVENTION

It is a primary object of this invention to adapt a system for controlling the thermostat of a water heater depending upon actual hot water usage in a practical manner, to be used with standard thermostat control structures.

A large percentage of residential thermostats for gas water heaters are of two varieties, each having a substantially rectangular housing with a round control knob on the front. These rectangular housings have different dimensions and one of the control knobs rotates clockwise while the other rotates counterclockwise to increase temperature.

This invention provides apparatus including a mounting bracket which is adapted to fit on both common types of thermostat control boxes and to receive a controller housing. Modifications can be made to accommodate additional water heater control configurations other than rectangular boxes and round knobs. The controller housing encloses a motor connected to a crank on the front of the housing. A slip ring appropriately shaped for the thermostat knob is slid over the knob and an elongated drive arm is removably coupled between the crank and the slip ring to couple the motor to the thermostat control knob.

The motor typically rotates in one direction at a relatively low speed such as one RPM. By appropriately configuring the crank, drive arm and slip rings, the motor can appropriately control both types of thermostats, after a predetermined delay in the system, to raise and lower the temperature based upon usage of the hot water.

The apparatus includes a self-adjusting feature with respect to the slip rings so that the thermostat control knobs cannot be overdriven in either direction. Additionally, the interlocking apparatus between the mounting bracket and the controller housing include biasing means to prevent one element from moving with respect to the other, together with means on the controller housing for preventing the bracket from being removed from the thermostat housing.

BRIEF DESCRIPTION OF THE DRAWING

The objects, advantages and features of this invention will be more readily apparent from the following detailed description when read in conjunction with the accompanying drawing in which.

DESCRIPTION OF THE PREFERRED EMBODIMENT

Figure 1:
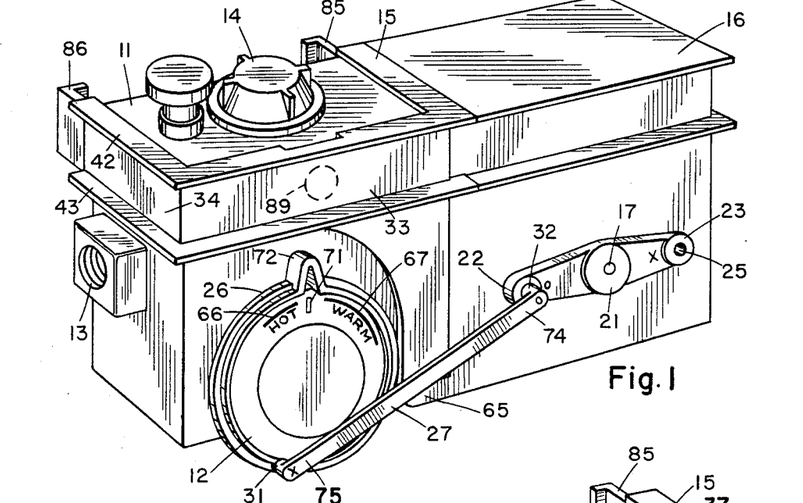
FIG. 1 is a perspective view of the apparatus of this invention mounted to a thermostat control box of a first configuration.

With reference now to the drawing and more particularly to FIG. 1 thereof, there is shown a thermostat control box 11 having a control knob 12. The particular thermostat shown is for a gas-fired water heater so incoming gas coupling 13 is shown along with pilot lighting apparatus 14. Any controllable thermostat may be controlled by this apparatus and the type of fuel used is unimportant.

The present invention comprises a mounting bracket 15 removably, slidably mounted on control box 11. Controller housing 16 is removably mounted to bracket 15, also in a sliding manner. A motor, shown schematically in FIG. 9, within housing 16 has a shaft 17 extending outwardly from the housing to which crank 21 is mounted. The crank is elongated and formed with two bosses 22, 23 having respective bores 24, 25 therein. For orientation purposes, as will be explained below, bores 24 and 25 are of different diameters. Drive ring 26 frictionally engages knob 12 and is coupled to crank 21 by means of drive arm 27. The drive arm is an elongated device having pins 31, 32 at either end which are adapted to fit in respective openings in the crank and the drive ring.

Figures 6, 7:
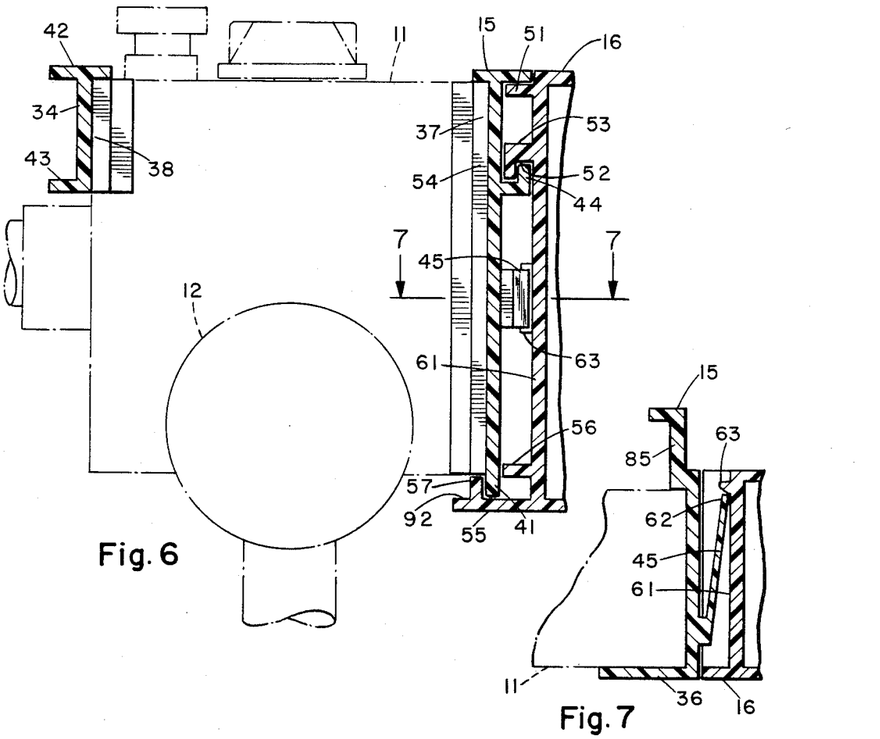
FIG. 6 is a sectional view taken along line 6—6 of FIG. 5.
FIG. 7 is a sectional view taken on line 7—7 of FIG. 6.

The apparatus of the invention will be discussed in greater detail with respect to FIGS. 2-7. Mounting bracket 15 has a front 33, a left side wing 34, a right side 35 and a lower partial front face 36. The bracket is adapted to engage control box 11 by sliding down over it so that the ends of the control box fit within depressions 37 and 38 on the right and left sides of the bracket respectively, confined at the rear by shoulders 39. This close fit can be easily appreciated from the top view of FIG. 5. Front face 36 is primarily for the purpose of adding strength to the bracket. Rib 41 extends downwardly beyond the bottom edge of partial front face 36. Lateral ridges 42 and 43 extend around all three sides of the brackets for added strength. Rib 44 projects upwardly a short distance from the right side of ridge 43. As shown in FIGS. 6 and 7, a leaf spring 45 is attached at one end to right side 35 of the bracket and angles outwardly toward the rear of the bracket.

Controller housing 16 is shaped and configured to mate with mounting bracket 15 in such a manner that it locks onto the thermostat control box. It is prevented from vibrating loose from the bracket and in turn prevents the bracket from vibrating loose from the thermostat housing. Housing 16 is formed with ridges 46 and 47 aesthetically matching the appearance of similar ridges on the bracket. Top shoulder 51 slides beneath the overhang of the right side of ridge 42 of the bracket so that the top surface of ridge 42 and the housing are flush when mounted together. An undercut slot 52 is formed by outwardly projecting shoulder 53 and downwardly projecting ridge 54 as best shown in FIG. 6. When the controller housing is slid onto mounting bracket 15, upwardly projecting rib 44 slides into slot 52 to firmly anchor the top portion of the housing to the bracket. At the bottom of the housing is laterally projecting ridge 55 parallel and spaced from shorter rib 56. Upwardly projecting rib 57 extends from ridge 55 and is perpendicular to and spaced from rib 56. Upon mounting the housing to the bracket, downwardly projecting rib 41 is closely confined between ribs 56 and 57 thereby securing the bottom portion of the housing and bracket together in a positive manner.

Referring to FIGS. 6 and 7, in order to prevent possible motion of the housing with respect to the bracket over a period of time, leaf spring 45 engages the left side 61 of the housing to provide a continuous bias of the housing away from the bracket. Additionally, the rearward end 62 of the leaf spring snaps in behind the chamfered forward facing edge of rib 63 so that the housing is essentially locked in place on the mounting bracket when fully engaged. However, because of the chamfer, it is possible by applying a specific back to front force on the housing for the end of the leaf spring to ride up over rib 63 and allow the housing to slide forward. It is possible that the leaf spring could be mounted on the controller housing, and that it could function effectively without the rib on the opposite unit.

Figures 2, 3, 4:
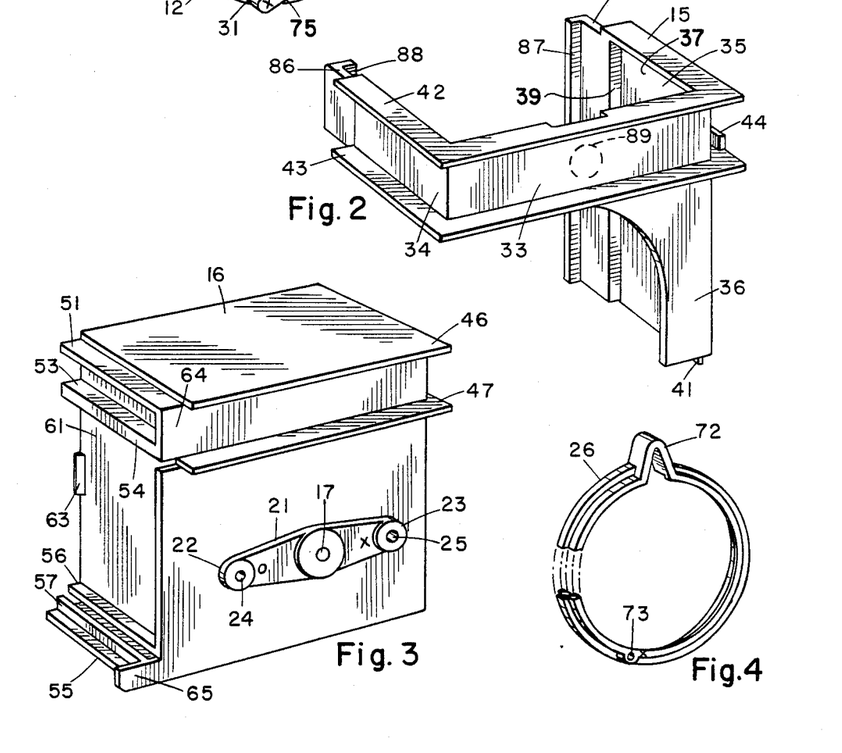
FIG. 2 is a perspective view of the mounting bracket shown in FIG. 1.
FIG. 3 is a perspective view of the controller housing shown in FIG. 1.
FIG. 4 is a perspective partially cut away view of the drive ring of FIG. 1.
Figure 5:
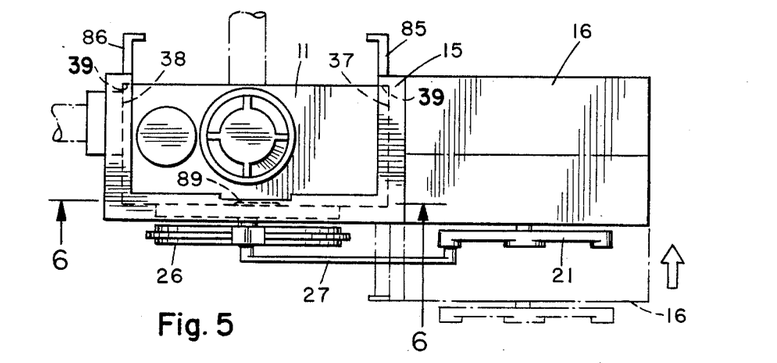
FIG. 5 is a top view of the apparatus of FIG. 1 showing the controller housing both partially and fully engaged on the mounting bracket.

With further reference to FIG. 6, it can be seen that rib 57 has a dual purpose. Not only does it confine the lower end of the right side of the bracket terminating in rib 41, it also provides an abutment adjacent the bottom of control box 11. With the bracket and housing mounted together and mounted on the control box, it is impossible to remove the assembly from the control box without first removing the housing from the bracket. This prevents the accidental misalignment or removal of the control apparatus due to vibration or other external forces without intentionally disconnecting its parts. In the vicinity of upper notch 52 formed by ribs 53 and 54 and lower rib 57 are facing portions 64 and 65 (FIG. 3). These provide a positive stop for positioning of the housing with respect to the bracket as the forward ends of ribs 44 and 41 respectively abut the inner surfaces of these facings. Once properly installed, the front surfaces of the bracket and the housing will be substantially flushed with each other.

For safety purposes, drive ring 26 as shown in FIG. 4 is adapted to slide over control knob 12 in an axial direction and frictionally engage it. However, it is specifically designed to rotationally or circumferentially slide with respect to the control knob at any time that it is not properly positioned and the control knob is driven to the high end stop by the control means of this invention. By being able to slide on the knob when at a stop, or rotate the knob when it is free to rotate, the drive ring automatically positions itself properly even it is initially installed improperly with respect to the control knob thus preventing the thermostat control from going to a dangerously high setting. One type of control knob is configured with a circumferential area 66 labelled "HOT", a longer circumferential area 67 labelled "WARM" and a normal indicator segment 71. The radial projection 72 of drive ring 26 is designed to be aligned with the normal position 71. Projection 72 has a dual function in that it also offers a size adjusting resiliency for the ring to be forced over the rim of knob 12. Drive ring 26 is also formed with a bore 73, the purpose of which will be explained below.

Drive arm 27 couples crank 21 with drive ring 26 by means of pins 31 and 32. For proper orientation of the crank and the drive arm with respect to the drive ring, each of these three elements has labels "O" and "X" so that the appropriate size pins of the drive arm are matched for proper operation of the apparatus. Thus at end 74 of the drive arm appears an "O" indicating that pin 32 fits in the "O" bore 24 in the crank. Likewise, end 75 of the drive arm has an imprint of an "X" indicating that pin 31 is adapted to fit into the mating "X" bore 73 of drive ring 26. As shown more clearly in FIG. 3, the "X" opening and "X" pin are larger than the corresponding "O" opening and "O" pin.

In operation, from the position shown in FIG. 1, counterclockwise rotation of the crank will cause counterclockwise rotation of drive ring 26 and consequently control knob 12 toward the lower or warm setting of the thermostat. The motor in housing 16 is designed, in conjunction with the system shown in FIG. 9, to rotate approximately 180° before stopping. At that point, the drive arm will have moved to the right and the thermostat will be at a low setting. When it is necessary to heat the water in the water heater, the motor again rotates approximately 180° in a counterclockwise direction but this time because of the relative positions of the crank, drive arm and drive ring, the control knob rotates in a clockwise direction resulting in a hotter setting of the thermostat.

Figure 8:
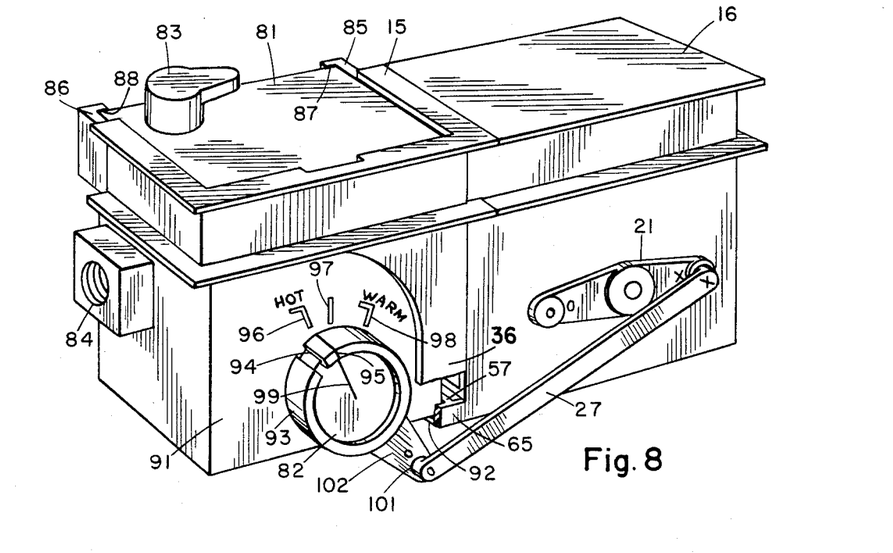
FIG. 8 is a perspective view similar to FIG. 1 with the apparatus mounted to a second type of thermostat control box.

The same apparatus as shown in FIG. 1 is shown in FIG. 8 but mounted to a thermostat control box 81 of different size than control box 11. Thermostat 81 has control knob 82 and pilot apparatus 83 along with a connector 84 for the fuel supply. Because thermostat housing 81 is deeper front to back, slightly larger top to bottom and slightly narrower left to right, there are differences in the way the apparatus of this invention fits with respect to that housing. Extensions 85 and 86 (FIGS. 1, 2 and 8) of the mounting bracket are provided with shoulders 87 and 88 which engage the rear corners of the housing 81. The forward corners of the housing are within the front portion of the bracket and the front face 91 of the thermostat is flush against the inside surface of the front 33 of the bracket. The lower end of the thermostat housing extends somewhat below the bottom of front face 36 and rib 57 fits between lower projecting rib 41 and the lower right corner of that housing. To prevent removal of the apparatus from the thermostat without first removing controller housing 16, shoulder 92 on ridge 55 abuts the lower edge of the housing and prevents removal of the bracket from the thermostat. Otherwise the connection between the thermostat, the bracket and the housing is the same as described above with respect to thermostat 11 in FIG. 1.

To accommodate minor variations in the size of the thermostat box, bracket 15 is formed with a take-up button 89 on the inside surface of front 33. This ensures a snug fit of the bracket onto the box. If the bracket is properly sized, a slight outward flexing of the front will occur when the bracket is mounted on the thermostat. If there is some element of play, the button will take up the additional space for a tight fit.

Control knob 82 is substantially smaller than the control knob shown in FIG. 1 and has a somewhat different configuration drive ring. Where radial projection 72 allows the necessary expansion of drive ring 26 for engaging knob 12, drive ring 93 is formed with a gap 24 which allows the circumferential flexibility necessary for fitting on to the thermostat knob. Of course, either ring may use either or both adjustment configurations. Ring 93 is provided with positioning indicia 95 corresponding with setting position indicator line 99 on the knob and being selectively aligned with the HOT, normal and WARM positions 96, 97 and 98 of thermostat 81. In order to accommodate the different knob sizes bore 101 designated by a O is positioned on radially extending tab 102 so that the radial distance of bore 101 from the knob axis for connection with drive arm 27 is substantially the same as the radial distance of bore 73 from the axis of control knob 12.

In the position shown in FIG. 8, the thermostat is at a HOT setting and counterclockwise rotation of crank 21 provides clockwise rotation of knob 82 to return it to a lower setting. When the WARM position has been reached, subsequent substantial demand for hot water will cause the motor to rotate once again in the counterclockwise direction for approximately 180° causing counterclockwise rotation of control knob 82 and returning it to the HOT setting.

Figure 9:
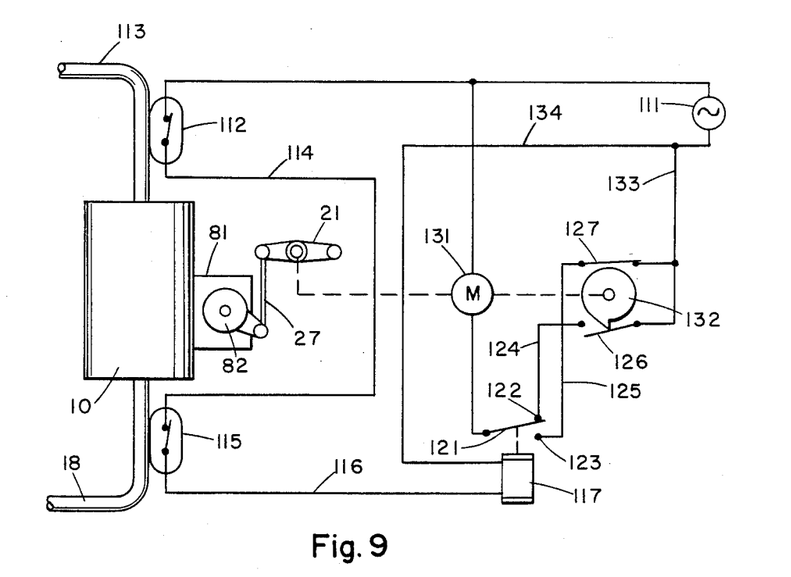
FIG. 9 is a schematic of a system with which the present invention may be employed.

FIG. 9 is an exemplary schematic diagram of a control system with which the apparatus of this invention may be adapted to work. AC power supply 111 provides the necessary electrical power, which may be stepped down by an appropriate transformer, to the system voltage, typically 24 volts AC. One side of the power supply is connected to thermostatic switch 112 which, in this configuration, is preferably a reed switch simply positioned on the side of the outflow pipe 113 by suitable means. Switch 112 is connected by means of wire 114 to supply side thermostatic switch 115, also preferably a thermally controlled reed switch in this configuration. Switch 115 is connected by means of wire 116 to coil or solenoid 117 controlling switch 121 between contacts 122 and 123. These contacts are connected in turn by means of wires 124 and 125 respectively to switches 126 and 127 controlled by motor 131 and cam assembly 132. Both of these switches are connected by means of wire 133 to the other side of power supply 111. That same side of power supply 111 is connected by means of wire 134 to the other side of solenoid 117. Motor 131 is connected between the first side of the power supply and switch 121 which is controlled by solenoid 117. The motor is connected to crank 21 which in turn is connected to thermostat knob 82 by means of drive arm 27.

Any system sensitive to the outflow, or to both outflow and supply lines of the water heater to control motor 131 can be employed with the apparatus of the present invention to change the temperature setting of the thermostat. Thus the particular circuitry shown in FIG. 9 is not critical to the present invention, but is shown for expository purposes. With minor modifications the reed thermostatic switches can be replaced by other switches at these or other locations, or even by different types of sensors which provide the inputs necessary for the system to respond to demand for heating water in the tank. The thermo switches shown are externally mounted, but internally mounted sensors actuated by heat, pressure or flow rate, or a combination of such sensors may be used to provide the information to which the control circuit responds.

It should be noted that if mounting bracket 15 is to be used with thermostat housing 11, rearward extensions 85 and 86 can simply be snapped off because they have no function in that situation. However, they could be left on as they do not interfere with the thermostat and its operation.

One particular advantage of the present invention is that it can be used to convert present installations of thermostat controls for hot water heaters without the use of any tools. The circuitry and motor are all enclosed within controller housing 16, the bracket and drive rings are easily slid onto the appropriate portions of the existing thermostat and the thermostatic switches 112 and 115 can be simply taped or bracketed onto the appropriate water pipes. The only thing necessary would then be to plug the unit into a source of normal electrical current. There is no need to modify or in any way convert the basic thermostat unit to function properly with the present invention. Another significant advantage of this invention is that the water heating system tends to go to a low setting at all times, the objective being to keep the thermostat low or off except when there is a specific requirement for a significant amount of hot water. Still another advantage of this system is in its safety aspects. It cannot drive the thermostat too high because when it hits the high stop the drive ring slips on the control knob. Further, if the control knob should become frozen and prevented from rotating, the motor will simply stall without in any way damaging it.

From the above description it should be clear that with certain modifications to the mounting bracket, drive arm, crank and slip ring or other means for connecting to the thermostat control, the present apparatus can accommodate a large number of different water heater thermostat configuration. An elongated control bar instead of a knob could also be accommodated by the present system.

The above description applies particularly to gas fired hot water heaters. However, the principles of the invention apply equally to any type of heat source, including oil and electric, that is controllable by an externally accessible device.

To summarize in simple terms, the apparatus operates as follows. Assuming that the water heater is full of hot water and that no hot water is being drawn, the system is in a "shut down" mode. The thermostat has been turned, by the drive motor, to the low position. In order for the system to be activated and turn the thermostat to the high setting to heat water, two conditions must be satisfied. First, there must be a draw or use of hot water and, second, the hot water available in the water heater tank and flowing out of the hot water pipe must be below a predetermined temperature. The system is normally at either the full on (high) or full off (low) position, resulting in substantial fuel savings.

Under these operating parameters, a number of conditions may occur. These are:

1. Short hot water draw. The user draws a small amount of hot water, say to rinse some dishes. The cold water sensor will immediately activate upon the inflow of cold water, but as long as the outgoing hot water temperature excedes its present limit, the total system will not activate and permit the hot water heater to fire. This condition may exist over a number of small hot water draws. The system will not activate the thermostat control until the outgoing hot water temperature falls below the present temperature. The control system is designed with a built-in delay to permit a limited number of short draws of hot water before it will operate to reheat the water in the tank.

2. No hot water draw over an extended period. Over extended periods of no hot water usage, which may in some cases be only overnight, but which will more normally be weekends away from home, the water temperature in the hot water heater will fall below the present minimum, typically 100° F. Under this condition, the system will not activate but the water heater will fire to maintain the minimum temperature. The hot water sensor will activate because the hot water temperature is down, but the cold water sensor will not activate because there is no water use and, therefore, the thermostat setting will remain in the low position. As soon as hot water is drawn and cold water enters the system, the cold water sensor will activate and the entire system will sequence to move the thermostat into the HOT position, thus heating the water in the hot water tank up to the present high setting.

3. Normal hot water usage. Under more normal hot water use, such as showers, dishwasher operation, clotheswasher operation, etc., the system will operate as follows. Immediately upon use of hot water, the cold water sensor will sense incoming cold water and activate. As hot water is used, the water temperature in the hot water tank will drop due to the inflow of cold water. As soon as the outgoing hot water reaches the predetermined minimum temperature, the hot water sensor will not activate and the entire system will then operate to move the thermostat control from low to high, thus firing the hot water heater. Once the hot water draw stops, thus stopping the inflow of cold water, the cold water sensor will almost immediately deactivate. When the water in the tank reaches its predetermined temperature, the hot water sensor will then also deactivate and the system will return the thermostat control to the low position.

In view of the above description, it is likely that modifications and improvements will occur to those skilled in the art which are within the scope of the accompanying claims.

What is claimed is:

1. Apparatus for controlling a thermostat, said thermostat having a control box and an externally accessible, rotatable control element, said apparatus comprising:
    a mounting bracket adapted to removably slide over and at least partially enclose said thermostat control box;
    a controller housing connected to said mounting bracket;
    a motor in said housing having an externally accessible shaft;
    crank means mounted to said shaft for rotation therewith;
    drive means comprising the thermostat control element; and
    an elongated drive arm removably and rotatably coupled at one end to said crank means and at the other end to said drive means, whereby rotation of said crank means changes the setting of the thermostat.

2. The apparatus recited in claim 1 and further comprising:
    means for preventing said bracket from being removed from the thermostat when mounted thereto.

3. The apparatus recited in claim 2 wherein said means for preventing removal of said bracket from the thermostat comprises a ridge extending laterally from said controller housing and underlying the thermostat control box.

4. The apparatus recited in claim 1, wherein said mounting bracket is formed with a pair of spaced forward facing shoulders adapted to engage the rear corners of a thermostat of a first configuration.

5. The apparatus recited in claim 1, wherein said mounting bracket is adapted to rest adjacent one end of the thermostat control box and has front and back portions extending partially over the front and back faces of the thermostat control box.

6. The apparatus recited in claim 1 wherein said drive means a drive comprising ring and said drive ring is radially flexible.

7. The apparatus recited in claim 6 wherein said radial flexibility is provided by a gap in the circumference of said drive ring.

8. The apparatus recited in claim 6 wherein said radial flexibility is provided by an expansion section radially projecting from the circumference of said drive ring.

9. The apparatus recited in claims 1 wherein said drive arm is formed with spaced parallel pins, and said drive means and said crank means are formed with bores each adapted to receive one of said pins.

10. The apparatus recited in claim 9 wherein said drive arm pins are of different diameters, said bores being of different diameters so that said drive arm can interconnect said crank means and said drive means in only one way.

11. The apparatus recited in claim 9 wherein:
    said crank means is formed with two bores diametrically arranged, said bores having different diameters;
    said drive means comprises at least two interchangeable said drive means, each adapted to accommodate a thermostat control element of different diameter;

said drive means each having a bore radially spaced from the axis of said drive means;
said drive arm pins are of different diameters, configured to selectively positively engage said bores in said crank means and said drive means;
whereby one of said pins engages one of said crank means bores and the bore in one of said drive means, and alternatively the other of said pins engages the other of said crank means bores and the bores in the other of said drive means, thereby adapting said apparatus to different thermostat controls.

12. The apparatus recited in claim 1 wherein said controller housing is shaped and configured to removably slidably engage said mounting bracket.

13. The apparatus recited in claim 12 wherein said mounting bracket has a front and is formed with two sets of forward facing shoulders, one set being spaced further from said front than the other set, said one set having less spacing between them, to thereby accommodate a thermostat control box both narrower and deeper than fits within each other set of shoulders.

14. The apparatus recited in claim 13 wherein said one set of shoulders are formed on extensions projecting rearwardly on said bracket from said other set of shoulders, said extensions being adapted to be snapped off said bracket when not used to engage a thermostat control box.

15. The apparatus recited in claim 12 wherein:
said mounting bracket is formed with a front;
said apparatus further comprising a rearwardly projecting take-up button on the rearward facing side of said front, said button ensuring a snug front-to-back fit with the thermostat control box.

16. The apparatus recited in claim 12 wherein:
said bracket is formed with a laterally projecting ridge;
said ridge is formed on one side of said bracket with an upwardly projecting rib; and
said one side of said bracket is formed with a downwardly projecting rib spaced from said upwardly projecting rib.

17. The apparatus recited in claim 16 wherein:
the side of said controller housing engaging said bracket is formed with a downward facing groove and an upward facing groove spaced from said downward facing groove;
said downward and upward facing grooves being shaped and configured to respectively engage said upwardly projecting rib said downwardly rib in sliding fashion to positively retain said controller housing and bracket together.

18. The apparatus recited in claim 17 wherein said upward facing groove is formed by a rib extending upwardly from a ridge extending laterally from said controller housing, and a second laterally extending rib spaced from and parallel to said ridge.

19. The apparatus recited in claim 12 and further comprising:
a leaf spring having one end mounted on one of said bracket and said controller housing and extending outwardly toward the other of said bracket and housing;
whereby said bracket and controller housing are biased away from each other to prevent relative movement therebetween due to vibration.

20. The apparatus recited in claim 19 and further comprising:

a rib on the other of said bracket and controller housing positioned adjacent the free end of said leaf spring;
so that when said controller housing is fully mounted to said bracket, said leaf spring snaps past said rib whereby said bracket and controller housing are positively engaged and positioned unless and until a positive force is applied to slide them apart.

21. The apparatus recited in claim 12 and further comprising:
means for preventing said bracket from being removed from the thermostat when said controller housing is mounted thereto.

22. The apparatus recited in claim 18 wherein:
said rib extending upwardly from said ridge on said controller housing is positioned beneath the bottom surface of the thermostat control box when said bracket and controller housing are mounted thereto;
whereby said bracket is prevented from being removed from the thermostat.

23. The apparatus recited in claim 21 wherein said means for preventing removal of said bracket from the thermostat comprises a rib on said controller housing underlying the thermostat control box.

24. The apparatus recited in claim 18 wherein:
said ridge extends beyond said upwardly extending rib and is positioned beneath the bottom surface of the thermostat control box when said bracket and controller housing are mounted thereto;
whereby said bracket is prevented from being removed from the thermostat.

25. The apparatus recited in claim 12 wherein said means for preventing removal of said bracket from the thermostat comprises a ridge extending laterally from said controller housing and underlying the thermostat control box.

26. The apparatus recited in claim 17 and further comprising a stop element on one end of each said groove in said controller housing to prevent sliding engagement of said controller housing with respect to said bracket beyond the point of alignment thereof.

27. The apparatus recited in claim 12 wherein said drive means comprises a drive ring and said drive ring is radially flexible.

28. The apparatus recited in claim 27 wherein said radial flexibility is provided by a gap in the circumference of said drive ring.

29. The apparatus recited in claim 27 wherein said radial flexibility is provided by an expansion section radially projecting from the circumference of said drive ring.

30. The apparatus recited in claim 12 wherein said drive arm is formed with space parallel pins, and said drive ring and wherein said drive means comprises a drive ring and, said drive ring and said crank are formed with bores each adapted to receive one of said pins.

31. The apparatus recited in claim 30 wherein said drive arm pins are of different diameters, said bores being of different diameters so that said drive arm can interconnect said crank and said drive ring in only one way.

32. The apparatus recited in claim 30 wherein:
said crank is formed with two bores diametrically arranged, said bores having different diameters;
said drive ring comprises at least two said drive rings to accommodate the thermostat control element of different diameters;

said drive rings each having a bore radially spaced from the axis of said drive ring;

said drive arm pins are of different diameters, configured to selectively positively engage said bores in said crank and said drive rings;

whereby one of said pins enagages one of said crank bores and the bore in one of said drive rings, and alternatively the other of said pins engages the other of said crank bores and the bore in the other of said drive rings, thereby adapting said apparatus to different thermostat controls.

33. Apparatus for controlling a thermostat, said thermostat having a control box and an externally accessible, rotatable control element, said apparatus comprising:

a mounting bracket adapted to removably slide over and at least partially enclose said thermostat control box;

a controller housing shaped and configured to removably slidingly engage said mounting bracket;

a motor in said housing having an externally accessible shaft;

a crank mounted to said shaft for rotation therewith;

a drive ring frictionally engaging the thermostat control element; and an elongated drive arm removably and rotatably coupled at one end to said crank and at the other end to said drive ring, whereby rotation of said crank changes the setting of the thermostat.

34. The apparatus recited in claim 33 wherein said mounting bracket has a front and is formed with two sets of forward facing shoulders, one set being spaced further from said front than the other set, said one set having less spacing between them, to thereby accommodate a thermostat control box both narrower and deeper than fits within said other set of shoulders.

35. The apparatus recited in claim 34 wherein said one set of shoulders are formed on extensions projecting rearwardly on said bracket from said other set of shoulders, said extensions being adapted to be snapped off said bracket when not used to engage a thermostat control box.

36. The apparatus recited in claim 33 wherein:
said mounting bracket is formed with a front;
said apparatus further comprising a rearwardly projecting take-up botton on the rearward facing side of said front, said button ensuring a snug front-to-back fit with the thermostat control box.

37. The apparatus recited in claim 33 wherein:
said bracket is formed with a laterally projecting ridge;
said ridge is formed on one side of said bracket with an upwardly projecting rib; and
said one side of said bracket is formed with a downwardly projecting rib spaced from said upwardly projecting rib.

38. The apparatus recited in claim 37 wherein:
the side of said controller housing engaging said bracket is formed with a downward facing groove and an upward facing groove spaced from said downward facing groove;
said downward and upward facing grooves being shaped and configured to respectively engage said upwardly projecting rib said downwardly rib in sliding fashion to positively retain said controller housing and bracket together.

39. The apparatus recited in claim 38 wherein said upward facing groove is formed by a rib extending upwardly from a ridge extending laterally from said controller housing, and a second laterally extending rib spaced from and parallel to said ridge.

40. The apparatus recited in claim 33 and further comprising:
a leaf spring having one end mounted on one of said bracket and said controller housing and extending outwardly toward the other of said bracket and housing;
whereby said bracket and controller housing are biased away from each other to prevent relative movement therebetween due to vibration.

41. The apparatus recited in claim 40 and further comprising:
a rib on the other of said bracket and controller housing positioned adjacent the free end of said leaf spring;
so that when said controller housing is fully mounted to said bracket, said leaf spring snaps past said rib whereby said bracket and controller housing are positively engaged and positioned unless and until a positive force is applied to slide them apart.

42. The apparatus recited in claim 33 and further comprising:
means for preventing said bracket from being removed from the thermostat when said controller housing is mounted thereto.

43. The apparatus recited in claim 39 wherein:
said rib extending upwardly from said ridge on said controller housing is positioned beneath the bottom surface of the thermostat control box when said bracket and controller housing are mounted thereto;
whereby said bracket is prevented from being removed from the thermostat.

44. The apparatus recited in claim 42 wherein said means for preventing removal of said bracket from the thermostat comprises a rib on said controller housing underlying the thermostat control box.

45. The apparatus recited in claim 39 wherein:
said ridge extends beyond said upwardly extending rib and is positioned beneath the bottom surface of the thermostat control box when said bracket and controller housing are mounted thereto;
whereby said bracket is prevented from being removed from the thermostat.

46. The apparatus recited in claim 42 wherein said means for preventing removal of said bracket from the thermostat comprises a ridge extending laterally from said controller 4 housing and underlying the thermostat control box.

47. The apparatus recited in claim 38 and further comprising a stop element on one end of each said groove in said controller housing to prevent sliding engagement of said controller housing with respect to said bracket beyond the point of alignment thereof.

48. The apparatus recited in claim 33 wherein said drive ring is radially flexible.

49. The apparatus recited in claim 48 wherein said radial flexibility is provided by a gap in the circumference of said drive ring.

50. The apparatus recited in claim 48 wherein said radial flexibility is provided by an expansion section radially projecting from the circumference of said drive ring.

51. The apparatus recited in claim 33 wherein said drive arm is formed with space parallel pins, and said drive ring and said crank are formed with bores each adapted to receive one of said pins.

52. The apparatus recited in claim 51 wherein said drive arm pins are of different diameters, said bores being of different diameters so that said drive arm can interconnect said crank and said drive ring in only one way.

53. The apparatus recited in claim 51 wherein:

said crank is formed with two bores diametrically arranged, said bores having different diameters;

said drive ring comprises at least two said drive rings to accommodate the thermostat control element of different diameters;

said drive rings each having a bore radially spaced from the axis of said drive ring;

said drive arm pins are of different diameters, configured to selectively positively engage said bores in said crank and said drive rings;

whereby one of said pins engages one of said crank bores and the bore in one of said drive rings, and alternatively the other of said pins engages the other of said crank bores and the bore in the other of said drive rings, thereby adapting said apparatus to different thermostat controls.

* * * * *

UNITED STATES PATENT AND TRADEMARK OFFICE
CERTIFICATE OF CORRECTION

PATENT NO. : 4,549,160

DATED : October 22, 1985

INVENTOR(S) : James B. McGhee

It is certified that error appears in the above-identified patent and that said Letters Patent is hereby corrected as shown below:

Claim 1, column 8, line 19, change "comprising" to --engaging--.

Claim 17, column 9, line 50, after the word "rib" (first Occurrence) insert -- and --

Claim 17, column 9, line 50, after the word "downwardly" insert --projecting--.

Claim 32, column 11, line 6, change "enagages" to --engages--.

Claim 46, column 12, line 51, after the word "controller" delete "4".

Claim 38, column 11, line 64, after the word "downwardly"

insert -- projecting --.

Claim 38, column 11, line 64, after the word "rib", (first occurrence) insert -- and --.

Signed and Sealed this

Thirteenth Day of May 1986

[SEAL]

Attest:

DONALD J. QUIGG

Attesting Officer

Commissioner of Patents and Trademarks